United States Patent [19]

Whitlock

[11] 4,289,057
[45] Sep. 15, 1981

[54] PATTERN COMPOSER FOR FINGERBOARD INSTRUMENT INSTRUCTION

[76] Inventor: Robert R. Whitlock, 2227 Charleston Pl., Hyattsville, Md. 20783

[21] Appl. No.: 101,185

[22] Filed: Dec. 7, 1979

Related U.S. Application Data

[63] Continuation-in-part of Ser. No. 734,885, Oct. 22, 1976, Pat. No. 4,175,468.

[51] Int. Cl.³ .............................................. G09B 15/02
[52] U.S. Cl. .................................. 84/485 SR; 84/473
[58] Field of Search ................... 84/471 SR, 473, 474, 84/480, 485 R, 485 SR

[56] References Cited

U.S. PATENT DOCUMENTS

| | | | |
|---|---|---|---|
| 2,280,593 | 4/1942 | Maffei | 84/480 |
| 2,322,465 | 6/1943 | Mihailoff | 84/485 SR |
| 3,668,967 | 6/1972 | Malis | 84/471 SR |
| 3,712,167 | 1/1973 | Renault | 84/485 SR |
| 3,748,947 | 7/1973 | Freiheit | 84/485 SR |
| 3,758,698 | 9/1973 | Matyas | 84/485 SR |
| 3,890,875 | 6/1975 | Leonard | 84/471 SR |
| 4,069,737 | 1/1978 | Andersson | 84/485 SR |
| 4,175,468 | 11/1979 | Whitlock | 84/485 SR |

FOREIGN PATENT DOCUMENTS 12695 of 1894 United Kingdom .................. 84/473

*Primary Examiner*—Lawrence R. Franklin

[57] ABSTRACT

Apparatus for composing and indicating finger pattern information for a musical stringed fingerboard instrument comprising a plurality of alignably repositionable first series of first indicia, each first series representing at least one course of said stringed fingerboard instrument, the locations of said first indicia forming a mapping image of allowable locations for fingering the respective courses of the stringed fingerboard instrument to sound musical tones.

8 Claims, 2 Drawing Figures

PATTERN COMPOSER FOR FINGERBOARD INSTRUMENT INSTRUCTION

This application is a continuation-in-part of Ser. No. 734,885, filed Oct. 22, 1976, now U.S. Pat. No. 4,175,468.

FIELD OF THE INVENTION

This invention lies in the field of indicators of finger pattern information for playing stringed fingerboard musical instruments.

PRIOR ART

Several aids are already available for teaching finger positions of stringed fingerboard instruments. Chord manuals and instruction books remain the most common teaching aids for chords and scales. These aids are very helpful in that they provide beginning students with instruction as to the easiest of the customary finger assignments and hand positions. However, when manuals attempt to present a broad selection of chord fingerings, they become very lengthy, perhaps to the point of giving the appearance that playing musical instruments is more complicated than it really is. Chord manuals are generally dedicated to a single instrument at a time, thus failing to point out the simplifying similarities between the various instruments which could encourage the student to broaden his instrument repertoire with little additional learning effort. Rarely is any mention made of chord diagrams or scale patterns for tunings other than the standard tuning for the instrument.

The chord constructor approach has the potential versatility to accommodate the needs unsatisfied by manuals and books. Some progress has been made in this area; for example, many chord constructors derive an increased ability to display finger pattern information by completely ignoring finger assignment information. This trade-off can be easily accepted by students of even very modest ability. Nonetheless, there remain other needs to which chord constructors have not adequately addressed themselves.

Chord constructors have been disclosed for Tenor Banjo and Guitar in standard tuning. Previous devices have pointed out the relevance of chord constructors to other stringed instruments, but there has been insufficient emphasis on the value of a single device for indicating chords or scales for more than one instrument. Also, nonstandard tunings, their interrelationships and unifying principles have received insufficient treatment from both the manuals and the previous chord constructors. Nonstandard tunings are indeed of considerable contemporary interest, and a teaching aid addressed to the composing of chord and scale fingering patterns for arbitrary tunings would help the student to recognize the unifying concepts in this area.

The simplicity of such a teaching aid should be optimized in its structure and in its display. The excessive use of overlays or windows may require that portions of the display remain hidden from view, giving an unnecessary impression of inherent complexity. Furthermore, the inclusion of superfluous or invariant information in the fingering pattern is a detraction from the simplicity of the chord or scale display. For instance, the correspondence between scale degrees and not names of a given key is an invariant which never changes, regardless of the chord type, the instrument, or the tuning. This invariant information is often better suited to tabulation on paper than to inclusion as an integral part of chord or scale displays, generated by an apparatus.

OBJECTS

It is therefore an object of this invention to provide an apparatus for composing chord and scale finger pattern information of any chord or scale in any tuning of essentially any fretted or nonfretted stringed fingerboard instrument with any reasonable number of strings.

Another object is to provide an apparatus which is easily and inexpensively constructed, durable, with few moving parts, but nonetheless with great diversity of application.

Yet another object is to provide an apparatus for indicating finger pattern information which, in its simplicity of construction, does not rely on perforations or peep-holes to perform its most basic functions.

Beyond the foregoing, a further object is to provide an apparatus for composing and indicating a finger pattern displaying the scale degrees in the makeup of a chord or scale, whereby the musician is not burdened by additonal mental computation of sharps or flats and whereby the beginner, whose knowledge of chord and scale makeup is scant, can successfully choose from the display one of each type of scale degree symbol for the makeup of the fingering to be played.

A still further object is to provide an apparatus for composing and indicating fingerboard note pattern information for a wide variety of congruent and noncongruent tunings.

SUMMARY

In accordance with one aspect of the invention, these and other objects are achieved by an apparatus for indicating finger pattern information for a musical stringed fingerboard instrument comprising a plurality of alignably repositionable first series of first indicia, each first series representing at least one course of said stringed fingerboard instrument, the locations of said first indicia forming a mapping image of allowable locations for fingering the respective courses of the stringed fingerboard instrument to sound musical tones.

Other objects and advantages of the invention will be apparent from the following specification and the accompanying drawings which are for the purpose of illustration only.

DETAILED DESCRIPTION OF THE DRAWINGS

Figure 1:
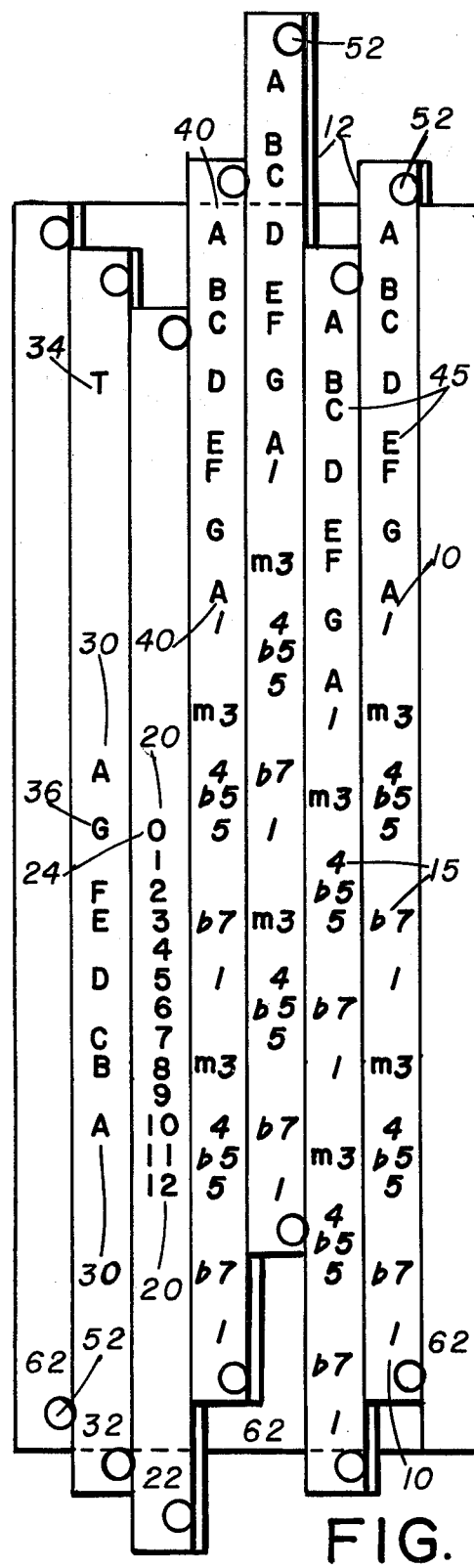
FIG. 1 is a plan view of an apparatus for composing fingering patterns, including a plurality of alignably repositionable fingering series, a plurality of tuning note series, a string stop series, a negative principal note series, and other features.

The detailed description of the drawings will be facilitated by an initial description of terms.

A course, in the context of stringed fingerboard instruments, is a string or a plurality of strings fingered as a unit and strung adjacent to one another, such as the double stringed courses of the Mandolin.

To "stop" a string of a fretted or nonfretted stringed fingerboard instrument refers, in my usage, to fixing or altering the total vibrational length of the string, thus fixing or altering the pitch of the tone which the string sounds. A string stop is a location on the stringed fingerboard instrument where the string is thus stopped. The nut of the stringed fingerboard instrument will hereinafter be referred to as zeroth string stop.

The note of a chord, such as the note G in a G major chord and the note F in an F major chord, is referred to as the root or root note of the respective chord. Similarly, the note of a scale, such as the note C in a C minor scale and the note A flat in an A flat blues scale, is referred to as the tonic or tonic note of the respective scale. The term "principal note" is hereinafter used to imply root note for chords and tonic note for scales.

Scale degree symbols are members of a set of symbols symbolizing the degrees of a musical scale, or modified degrees of the scale. For instance, a principal note of the major scale may be shown as a one and the fifth degree as a five; the symbol m3 may be used to symbolize a scale degree which corresponds to the lowering of the third degree of the major scale by one chromatic half step (i.e., a minor third).

The term "musical interval" generally is used to include a spacing of musical tonality together with a direction of increasing or decreasing pitch; the term is therefore a vector quantity. The term "musical intervallic magnitude" refers solely to the spacing of musical tonality, without of itself specifying a direction (scalar quantity).

According to terminology used herein, two stringed fingerboard instruments are said to be congruently tuned or tuned congruently to one another if all pairs of courses of one instrument are tuned to the same relative musical intervals as the respective pairs of courses of the other instrument, even though the respective individual courses of the two instruments may be tuned to different absolute pitches. Because there are twelve chromatic half-tones to an octave and because intervals on integral numbers of octaves are harmonically equivalent, any one tuning may be considered as a representative of and included in a class of twelve congruent tunings.

A fingering series has only one course coordinate in a first dimension (X), and therefore represents only one course of a stringed fingerboard instrument, but has a plurality of string stop coordinates in a second dimension, arbitrarily shown to be the Y or vertical dimension. Going from a single course of the instrument to the fingering series of the apparatus, a mapping is followed according to which ordinal numbers of the string stops at which the single course of the instrument may be fingered to sound particular tones are mapped into the string stop coordinates of indicia of the fingering series. When the particular tones are the tones of a chord or scale, the coordinates of the indicia of the fingering series form a mapping image, under the mapping, of allowable locations for fingering the stringed fingerboard instrument to sound musical tones of a chord or scale.

Fingering patterns of two dimensions, representing courses (X) and string stops (Y), may be composed by bringing the string stop coordinates of several fingering series into alignment. Going from the fingerboard of the instrument to the fingering pattern of the apparatus, a mapping is followed according to which ordinal numbers of the string stops and ordinal numbers of the courses at which the stringed fingerboard instrument may be fingered to sound particular tones are mapped into the string stop coordinates and course coordinates of indicia of the fingering pattern.

Referring now to the drawings, FIG. 1 shows by way of example a finger pattern composer in accordance with the invention. According to the embodiment, the indicator comprises a plurality of individual series of first indicia, hereinafter referred to as fingering series (10), shown in FIG. 1 to be scale degree symbols, on bases (12) and selectors for selecting string stops, & congruent tunings and principal note names. Each fingering series (10) illustrated in FIG. 1 represents a single course of a stringed fingerboard instrument, and is shown to span a range of (arbitrarily) twenty-five string stop coordinates (rows of indicia), although indicia are located at only thirteen of the twenty-five string stop coordinates. The string stop selector comprises a series of at least one second indicia, hereinafter referred to as string stop series (20), on a base (22). The fingering series (10) and the string stop series (20) are substantially adjacent and alignably repositionable with respect to each other. The congruent tuning and principal note name selector comprises a negative principal note series (30) of third indicia on a base (32), a principal note reference shown as an indicium zero (24) of the string stop series (20), a tuning reference mark (34) shown arbitrarily to be an indicium T on the base (32), and a plurality of positively directed tuning note series (40) on the bases (12). Means for maintaining the alignment of various series, shown to be locking screws (52), are provided for convenience in maintaining composed patterns as a unit.

Figure 2:
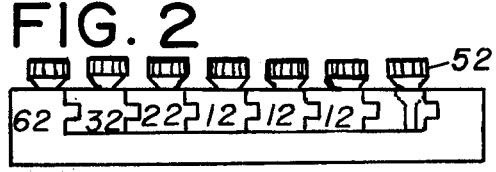
FIG. 2 is an end view of the apparatus of FIG. 1.

FIG. 2 is an end view of the apparatus of FIG. 1, showing the bases (12, 22, 32) and a sleeve piece (62).

The string stop coordinates of the indicia of the fingering series (20) in FIG. 1 form a mapping image of allowable locations to sound tones of the blues scale; the relationships of these tones to degrees of the major scale are symbolized as scale degree symbols by the respective (first) indicia. The first indicia can similarly symbolize scales other than the blues or major scales, or can symbolize chords. The fingering series do not indicate note names. A fingering pattern is composed by the fingering series (20) when the string stop coordinates of the various fingering series (20) are brought into alignment with one another, as shown in FIG. 1, by substantially vertical motion of the various fingering series. The reference symbol (15) is hereinafter used for the composed fingering pattern (15). The fingering series (10) of FIG. 1 may, in turn, be thought of as portions of a fingering pattern obtained by cutting between the several course coordinates of a fingering pattern to allow individual vertical series of first indicia to be vertically repositioned with respect to one another. Means (52) for maintaining the vertical alignment of the various series facilitates dealing with the composed fingering pattern as a unit.

The indicia of the string stop series (20) indicate ordinal numbers of the string stops of a stringed fingerboard instrument and have spacings which represent musical intervallic magnitudes characteristically used in stopping the strings of a stringed fingerboard instrument, such as the fretting intervals of a fretted instrument. The spacings are of such size that repositioning the string stop series (20) and the composed fingering pattern (15) with respect to each other in substantially the vertical direction brings indicia of the string stop series (20) into alignment with string stop coordinates of the fingering pattern (15), i.e., with string stop coordinates of the constituent fingering series (10). There is a plurality of positionings in which this alignment takes place. The musical intervals of string stops represented by the aligned coordinates of the fingering pattern (15) are the same as the musical intervals of string stops represented by the thereto aligned indicia of the string stop series (20). The string stop series (20) and the fingering pattern (15) need not be in the same or in parallel planes.

The fingering pattern (15) does not indicate a unique correlation between string stop coordinates of the fingering pattern (15) and string stops of the stringed fingerboard instrument. A particular string stop coordinate of the fingering pattern of FIG. 1 is chosen to correlate with a given string stop of the stringed fingerboard instrument (such as the zeroth string stop) by bringing the indicia of the string stop series (20) representing the given string stop (an indicium zero) into alignment with the particular string stop coordinate.

A fingering pattern for which such a correlation has been made is hereinafter referred to as a fingerboard pattern. The fingerboard pattern, the thusly aligned indicia of the spring stop series (20), the thereto aligned string stop coordinates of the fingering pattern (15), and the string stops so correlated are hereinafter described as selected.

When a correlation is established between only one string stop of the stringed fingerboard instrument and one string stop coordinate of the fingering pattern, then the correlation for remaining string stops is uniquely determined for an instrument having a given set of string stopping intervals: the ordinal numbering of other string stops proceeds according to the convention that string stop ordinal numbers increase as the total vibrational string length decreases. Thus, the selection of one string stop determines the selection of many stops.

In FIG. 1, indicia of the string stop series (20) align with string stop coordinates of the fingering pattern (15) and the correlation is thus determined and indicated for string stops zero through twelve. Following again this same procedure, alignably repositioning the string stop series (20) with respect to the fingering pattern (15) along substantially the vertical dimension comprises a new string stop selection and establishes a new correlation, i.e., a new fingerboard pattern.

The assignment of a correspondence of course coordinates of the fingering pattern with course numbers of the stringed fingerboard proceeds by visual inspection. For instance, in FIG. 1, the first (highest pitch, for most instruments) course of the stringed fingerboard instrument is represented by the rightmost of the course coordinates of the fingering pattern (15), and the fourth (lowest pitch) course by the leftmost, etc. Thus, the rightmost fingering series (10) represents the first course of the stringed fingerboard instrument, and the leftmost, the fourth course, etc.

In such manner, the fingering pattern (15) and the string stop series (20) operate together in a repositionable and alignable relationship to indicate a fingerboard pattern in accordance with which the stringed fingerboard instrument may be variously fingered to sound tones of a chord or scale.

The apparatus of FIG. 1 indicates a fingerboard pattern for playing the G blues scale on the four long strings of a Five String Banjo, tuned as D,G,B,D. When the musician places his fingers on the fingerboard of the Bango at the string stop and course locations indicated by the fingerboard pattern, the tones which are sounded by the vibrating strings are tones of the G blues scale.

An F blues scale may be indicated with this apparatus by alignably repositioning the string stop series vertically downward by a distance which corresponds to the musical interval from the note G to the lower note F. Thus, the apparatus of FIG. 1 selects fingerboard patterns for a plurality of principal notes. The identity of the principal note, as well as the tuning, are also indicated by the apparatus in a manner now to be set forth involving the congruent tuning and principal note name selector, this selector includes various note name series, in particular a negative principal note series and a plurality of tuning note series.

A note name series is a series of note name indicia having a single course coordinate and a plurality of string stop coordinates which specify the locations of note name indicia in the series. Going from the fingerboard of the instrument to the note name series of the apparatus, a mapping is followed according to which ordinal numbers of the string stops along a given course, at which the stringed fingerboard instrument may be fingered to sound respective tones with particular note names, are mapped into the string stop coordinates and the single course coordinate of the note name indicia of the note name series. The note name indicia indicate the note names of the respective tones.

It is evident that the chromatic ordering of the note names is of such an elementary nature in music instruction that the representation of some note names by blanks within a note name series, such as for those notes with sharps and flats, does not limit the content of the information being indicated and may even enhance legibility and clarity; the identity of any omitted note name is easily deduced by reference to nearby indicia which are not supplanted by blanks. For example, the identity of the note D# (or E flat) is easily deduced by virtue of its position between E natural and D natural.

A note name series is defined to have a direction, according to the following convention. The direction of increasing string stop number, as represented by the string stop series (20) of the apparatus, is hereinafter referred to as the positive direction, and the opposite direction as the negative direction. An example of a positive note name series is any of the tuning note series (40), while the negative principal note series (30) is a negative note name series.

Selecting a principal note name refers to the making of a musically correct correlation of a principal note name with a fingerboard pattern for playing tones of a chord or scale on a stringed fingerboard instrument in a particular tuning. The principal note name is selected by aligning the indicium of the negative principal note series (30) indicating the desired principal note with the principal note reference (24), shown to be the indicium zero of the string stop series (20).

The negative principal note series (30) of FIG. 1 represents a chromatic ordering of note names ascending in the negative direction. The negative principal note series (30) is not in fixed positional relation to either the fingering pattern (15) or the string stop series (20). The spacings of the indicia of the negative principal note series (30) allow pairs of (third) indicia representing note names to substantially align with pairs of string stop coordinates of the fingering pattern (15) representing pairs of string stops separated by the same musical intervallic magnitudes as the respective pairs of note names.

The principal note reference (24) is in fixed positional relation to the string stop series (20) and aligns with indicia of the negative principal note series (30). The principal note reference and the negative principal note series need not be in the same or in parallel planes. A principal not name is selected for a fingerboard pattern by bringing indicia of the negative principal note series (30) into alignment with the principal note reference (24); the thus-aligned third indicia indicate the selected principal note name, shown to be a G (36). Alignably repositioning the string stop series (20) and therewith the principal note reference (24) with respect to the fingerboard pattern (15), but holding the negative principal note series (30) and the fingering pattern (15) immobile with respect to each other, and bringing other indicia of the negative principal note series (30) into alignment with the principal note reference (24), thus effects a change in the principal note name selection as well as a corresponding change in fingerboard pattern. (The tuning is unchanged by this action.)

As an example of this action, consider, in FIG. 1, the fingerboard pattern for Banjo which is indicated to the principal note G of the blues scale. The apparatus can accommodate to the musician's desire for an indication of the blues scale to a different principal note. By moving the string stop series (20) upward until the A indicium of the negative principal note series (30) is brought into alignment with the principal note reference (24) (while holding all other series at their former locations), the principal note name is altered from G to A, a musical interval of two chromatic half-tones higher in pitch. The string stop series (20) is therewith also alignably repositioned with respect to the fingering pattern (15) by a corresponding amount, thus altering the fingerboard pattern. The resulting fingerboard pattern would indicate courses and string stop numbers for playing the A blues scale. The tuning is not altered.

The apparatus also allows convenient selection among congruent tunings. A single fingering pattern may serve a plurality of congruently tuned instruments. The twelve String Guitar, for instance, is commonly tuned congruently to the standard Guitar tuning but (typically) three chromatic half-tones lower, thereby reducing the string tension forces on the instrument and prolonging its life. Congruent tunings are quite common among stringed fingerboard instruments. Tunings used for Banjo, congruent to D,G,B,D, include C,F,A,C, and A,D,F♯,A, and E,A,C♯,E. Fingerings suitable for one tuning may also be used on a congruent tuning, although the principal note name will differ in the two cases. The manner of relating principal notes to tunings with the apparatus is now to be disclosed more fully.

Each of the fingering series (10) is shown to be in fixed positional relation to a positively directed tuning note series (40), indicating note names. The spacings of indicia of the tuning note series allow pairs of indicia representing tuning note names to align with pairs of string stop coordinates of a (separate) fingering series (10) representing pairs of string stops separated by the same musical intervallic magnitudes as the respective pairs of tuning note names. A fingering pattern is composed by the fingering series (10) when the string stop coordinates of the various fingering series (10) are brought into alignment with one another, as shown in FIG. 1, by substantially vertical motion of the plurality of fingering series (10). The plurality of positive tuning note series (40) are also therewith brought into alignment to compose a (positive) tuning note pattern, also as shown in FIG. 1. A plurality of substantially adjacent, aligned fingering series (10), each having a single course coordinate, compose a fingering pattern (15) having a plurality of course coordinates; likewise, a plurality of substantially adjacent, aligned tuning note series compose a tuning note pattern, hereinafter referenced with the symbol (45).

The congruent tuning for the fingerboard pattern is selected by aligning the tuning reference mark (34) with indicia of the tuning note pattern which indicate the desired congruent tuning. In the figure, in which indicia of the tuning note series are shown to extend over arbitratily thirteen string stop coordinates for purposes of illustration, the indicia of some of the tuning note series do not extend sufficiently to indicate all twelve congruent tunings, although the remaining congruent tunings are easily reckoned from the display. Tuning note series whose indicia extend over twenty five string stop coordinates would not require such reckoning. Noncongruent tunings are selected by bringing the tuning note series (40) into alignment with one another by virtue of substantially vertical motion to indicate the desired tuning; a fingering pattern is also composed by the fingering series (10). Tunings congruent to the thus selected tuning are selected in the manner heretofore taught.

Although the order of the steps of composing or selecting the fingering pattern, tuning, principal note, and string stops, is arbitrary, as long as a musically correct indication results, it is instructive to consider a particular ordering. First, having decided on a tuning, compose a tuning note pattern which indicates, from left to right along a single string stop (vertical) coordinate, the names of the notes of that tuning; the desired fingering pattern (15) is therewith also composed. Next, align the tuning reference mark (34) with the tuning note indicia (40) of the tuning pattern (45) which indicate the desired tuning. Finally, choose a principal note, and bring the principal note reference (24) into alignment with the note name indicia of the negative principal note series (30) which indicate the name of the desired principal note; the string stop series (20) is thereby aligned with the fingering pattern (15) to form a fingerboard pattern. The musician may then place his fingers on the fingerboard of the stringed fingerboard instrument, in the present example a Bango tuned D,G,B,D, at the string stop and course locations indicated by the fingerboard pattern (of FIG. 1), the tones which are sounded by the vibrating strings are tones of the G blues scale.

The apparatus shown in FIG. 1 exemplifies a broad approach by which chord or scale information can be selected for a variety of congruently or noncongruently tuned musical instruments. An important utility of the instant apparatus is therefore evident: the use of the instant apparatus enables a valid chord or scale fingerboard pattern to be composed for virtually any tuning or principal note of a given stringed fingerboard instrument, or for the tunings of other stringed fingerboard instruments. Changes in principal note names in any of the twelve congruent tunings are easily executed and are displayed in a convenient and readable manner.

Individual chord and scale fingering patterns made in this novel manner allow the student to visually explore and compare the distinctions and unifying similarities of broad classes of tunings, such as major tunings, minor tunings, or modal (suspended fourth) tunings.

A further feature of the instant apparatus is its capability to display the pattern of note names of tones sounded by the stringed fingerboard instrument, hereinafter referred to as fingerboard note pattern. A fingerboard note pattern (a type of pattern of musical invariants) is selected by use of a tuning note pattern (45) in cooperation with a string stop selector. A note name pattern is a two dimensional pattern of note name indicia; sring stop coordinates and course coordinates specify the locations of the note name indicia in the pattern. Going from the fingerboard of the instrument to the note name pattern of the apparatus, a mapping is followed according to which ordinal numbers of the string stops and ordinal numbers of the courses, at which the stringed fingerboard instrument may be fingered to sound respective tones with particular note names, are mapped into the string stop coordinates and course coordinates of note name indicia of the note name pattern. The note name indicia indicate the note names of the respective tones. The tuning note pattern (45) of the apparatus of FIG. 1 is a note name pattern. The tuning note pattern (45) may be treated as a unit by holding the tuning series in aligned and fixed position with respect to one another, whether by the use of alignment maintaining means (52) or otherwise. The string stop selector comprises a string stop series (20). (This selector operates with a positively directed note name pattern.) The tuning reference mark (34) may also serve as a string stop selector.

Thus, FIG. 1 is used as an example of the selection of fingerboard note patterns, using the tuning reference mark (34) as string stop selector. For this function, the negative principal note series (30) and the fingering pattern (15) are to be ignored, i.e., they are not needed. The tuning reference mark (34) representing, in this example, the zeroth string stop, is brought into alignment with the indicia of the note name pattern (the tuning note pattern (45)) indicating the desired congruent tuning; a correlation is thereby established correlating a specific string stop coordinate of the note name pattern with a specific string stop of the stringed fingerboard instrument.

A note name pattern for which such a correlation has been established is a fingerboard note pattern. The note names obtained at the zeroth string stop of the stringed fingerboard instrument are indicated by the note name indicia in alignment with the tuning reference mark (34). The note name indicia of the tuning reference pattern (45) which are two string stop coordinates below the tuning reference mark (34), i.e., E,A,C#,E, indicate the note names available at the second stop on the fingerboard of the stringed instrument, and so forth.

A further feature of the instant invention is the ease with which the fingering series (10) may be removed and replaced with fingering series pertaining to a different chord or scale. Series may be economically produced on any of a variety of materials, using well-known graphic and manufacturing techniques and processes.

A yet further novel and useful feature is for one set of bases (12) to have tuning note series (40), but no fingering series indicia; in place of the fingering series indicia, a suitable surface on the bases (12) would allow the musician to write, and subsequently erase, his own unique fingering series indicia for any chord or scale of interest. The flexibility of such a composing apparatus gives it a wide range of applicability.

It is obvious that dual-sided operation of the instant invention requires no new fundamental teaching. Viewing access to either side of the bases (12,22,32) could be assured by any of several means, including a substantially transparent sleeve (62), a substantially nontransparent sleeve (62) with large openings, or interlocking tongue and groove of substantial nature holding the bases (12,22,32) together without need of a sleeve. One possible dual-sided mode features a different fingering series (for different chords or scales) on either side of the bases (12), tuning note series (40) on one side only, and tuning reference mark (34) on the same side as the tuning note series (40), negative principal note series (30), string stop series (20), and principal note reference (24) on both sides. Another possible dual-sided mode presents the tuning note series (40) and tuning reference mark (34) on one side, and on the reverse side the fingering series (10), negative principal note series (30), string stop series (20) and principal note reference (24). A further possible dual-sided mode includes tuning note series (40) and the tuning reference mark (34) on one side, while on the reverse side are surfaces on the bases (12) on which the musician can write and erase indicia to form fingering series, a negative principal note series (30), a string stop series (20), and a principal note reference (24). Other arrangements of series and reference marks which permit dual-sided operation are obviously possible within the scope of the above disclosed teaching. The functioning of the apparatus is not altered in any material way by dual-sided operation (except for the occasional need to turn the apparatus over to see the other side). Further, there are numerous permutations, from left to right, of various series which are possible, but which in no way alter the operation of the instant invention.

In the instant invention, various indicia may be placed in locations other than at those illustrated in the figures, provided that corresponding changes are made to the locations of other series and patterns aligning therewith. Such variations, being equivalent functionally and easily derived from elementary music theory together with the already disclosed teaching, will not be further treated here.

As used herein, indicia may be any marks, symbols, characters, letters, or numbers. For example, indicia of fingering patterns (15) are shown as various combinations of symbols. As used herein, the terms indicia, symbol, indicating means, and the like, include the application of techniques for conveying information such as contrasting colors, contrasting shadings of light and dark, raised and lowered topographical features, variations in light reflection, variations in light emission, passive techniques such as printed indicia on a suitable base, and techniques which actively utilize energization, whether electrically, optically, magnetically, electromagnetically, or otherwise energized, with suitable substrate or base. Passive indicating techniques generally involve indicia which are in fixed positional relation to a particular local base, whereas actively energized indicating techniques exist which involve indicia that are not constrained to be in a fixed positional relation to a particular substrate or base. For example, printed indicia on a base are immobile with respect to the base, but indicia which are actively written by a signal generator on a cathode-ray-tube phosphor base may be moved with respect to the phosphor base. Patterns and series of indicia which are actively indicated are considered to be on the same base if they are simultaneously indicated in superposition. The terms "align," "alignment", etc., are not restricted to linear alignment characterized by right angles of 90°.

There is a rich variety in stringed fingerboard instruments which are in contemporary use in this country and throughout the world of music of the western (in distinction to oriental) tradition. This presents a large number of tunings to be addressed by a music instruction device. The number of nonstandard tunings extant is also appreciable, over forty for the Banjo alone. The instant apparatus, with its facility to compose and select fingerboard note patterns and fingerboard patterns (with the principal note being indicated) for arbitrary tunings is particularly well suited as an instruction aid in this area.

Obviously numerous modifications and variations of the present invention are possible in the light of the above teachings. It is therefore to be understood that within the scope of the appended claims the invention may be practiced otherwise than as specifically described therein.

I claim:

1. An apparatus for composing patterns of allowable locations for fingering a musical stringed fingerboard instrument to sound musical tones, comprising:
a plurality of first bases, a plurality of substantially parallel and substantially adjacent first series of at least one type of first indicia on said first bases, each said first series extending in substantially a single dimension representing the direction of extension of the strings of said stringed fingerboard instrument, each said series representing at least one course of said stringed fingerboard instrument and having a single course coordinate, string stop coordinates along said single dimension representing string stops along said course characteristic of musical intervals used in fingering said stringed fingerboard instrument, the direction of increasing said string stop coordinates representing the direction of increasing musical pitch on the stringed fingerboard instrument, said first indicia of each said first series being located at coordinates of said single dimension, said coordinates in said single dimension of said first indicia forming a mapping image of allowable locations for fingering said course of said stringed fingerboard instrument to sound certain musical tones within the chromatic scale, said first series being repositionable with respect to each other in a direction substantially along said single dimension, string stop coordinates of said single dimension of each of said substantially adjacent series having such spacings as to substantially align in said various repositionings with string stop coordinates of remaining said series of said plurality of first series;
whereby patterns for a plurality of courses may be composed by aligning said string stop coordinates of said plurality of series in accordance with the desired tuning.

2. The apparatus of claim 1, wherein:
the coordinates in said single dimension of said locations of said first indicia form a mapping image of allowable locations for fingering said stringed fingerboard instrument to sound musical tones within the chromatic scale, said tones being scale degrees or modified scale degrees included within a given chord or scale,
whereby fingering patterns may be composed for a given chord or scale by aligning said string stop coordinates of said plurality of said first series in accordance with the desired instrumental tuning.

3. The apparatus of claim 2, wherein:
said first indicia indicate the identity of said scale degrees or modified scale degrees.

4. The apparatus of claim 2, further comprising:
a second base, a string stop series of second indicia on said second base, said second indicia representing an ordinal numbering of string stops of said stringed fingerboard instrument, said ordinal numbering ascending in the same directional sense as the direction of increasing said string stop coordinates of said first series, said second indicia having spacings which represent musical intervallic magnitudes characteristically used in stopping the strings of said stringed fingerboard instrument and which are of such size that pairs of indicia of said string stop series align with pairs of string stop coordinates of said first series, said aligned pairs of string stop coordinates representing the same musical intervallic magnitudes as said spacings of said second indicia thereto aligned, said string stop series being substantially indicia thereto aligned, said string stop series being substantially adjacent to said first series along said single dimension of said first series, said string stop series and said first series being alignably repositionable with respect to each other in a direction substantially along said single dimension of said first series;
whereby string stops may be selected and a fingerboard pattern indicated.

5. The apparatus of claim 4, further comprising:
a principal note reference being present on said second base;
a third base, a tuning reference being present on said third base; a negative principal note series of third indicia being on said third base and being substantially adjacent to said first series and to said string stop series and being repositionable with respect to said first series and with respect to said string stop series in a direction substantially along said single dimension of said first series and representing a chromatic ordering of note names descending in musical pitch in the same directional sense as the direction of increasing musical pitch as represented by said string stop coordinates of said first series, pairs of said third indicia having such spacings as to be alignable with pairs of string stop coordinates of said first series representing the same musical intervallic magnitudes as characterized by said note names represented in turn by said third indicia so aligned; and
a plurality of substantially parallel and substantially adjacent note name series of fourth indicia on a plurality of said first bases, each said note name series being in fixed positional relation with respect to at least one of said first series located on the same respective first base and extending in substantially said single dimension of said first series, each said note name series representing at least one course of said stringed fingerboard instrument and having a single course coordinate, each said note name series being in substantially adjacent and repositionable relation with respect to said string stop series, to said tuning reference, and to said negative principal note series in a direction substantially along said single dimension of said first series, string stop coordinates along said single dimension of said note name series representing string stops along said course characteristic of musical intervals used in fingering said stringed fingerboard instrument, said string stop coordinates of said note name series having such spacings as to substantially align in said various repositionings with string stop coordinates of remaining series of said plurality of note name series, said fourth indicia of said note name series being located at said string stop coordinates of said note name series, said note name series representing a chromatic ordering of note names ascending in musical pitch in the same directional sense as the direction of increasing musical pitch as represented by said string stop coordinates of said first series, pairs of said fourth indicia having such spacings as to be alignable with pairs of said string stop coordinates of said first series representing the same intervallic magnitudes as characterized by said note names represented in turn by said fourth indicia so aligned, said string stop coordinates of said fourth indicia forming a mapping image of allowable locations for fingering said course of said stringed fingerboard instrument to sound pitches having said note names indicated by said respective fourth indicia;

whereby fingerboard patterns may be composed in any given congruent or noncongruent tuning, to any principal note, for any given chord or scale; and whereby fingerboard note patterns may be composed for any given tuning.

6. The apparatus of claim 1, wherein:

the coordinates in said single dimension of said locations of said first indicia form a mapping image of allowable locations for fingering said stringed fingerboard instrument to sound musical tones within the chromatic scale, said first indicia indicating the note names of said tones;

whereby note name patterns may be composed for any given tuning.

7. The apparatus of claim 6, further comprising:

a fifth base, a string stop series of fifth indicia on said fifth base, said fifth indicia representing an ordinal numbering of string stops of said stringed fingerboard instrument, said ordinal numbering ascending in the same directional sense as the direction of increasing said string stop coordinates of said first series, said fifth indicia having spacings which represent musical intervallic magnitudes characteristically used in stopping the strings of said stringed fingerboard instrument and which are of such size that pairs of indicia of said string stop series align with pairs of string stop coordinates of said first series, said aligned pairs of string stop coordinates representing the same musical intervallic magnitudes as said spacings of said fifth indicia thereto aligned, said string stop series being substantially adjacent to said first series along said single dimension of said first series, said string stop series and said first series being alignably repositionable with respect to each other in a direction substantially along said single dimension of said first series;

whereby string stops may be selected and a fingerboard note pattern indicated.

8. The apparatus of claim 7, further comprising:

a principal note reference being present on said fifth base;

a sixth base, a tuning reference being present on said sixth base;

a negative principal note series of sixth indicia being on said sixth base and being substantially adjacent to said first series and to said string stop series and being repositionable with respect to said first series and with respect to said string stop series in a direction substantially along said single dimension of said first series and representing a chromatic ordering of note names descending in musical pitch in the same directional sense as the direction of increasing musical pitch as represented by said string stop coordinates of said first series, pairs of said sixth indicia having such spacings as to be alignable with pairs of string stop coordinates of said first series representing the same musical intervallic magnitudes as characterized by said note names represented in turn by said sixth indicia so aligned; and a plurality of substantially parallel and substantially adjacent marking series of marking locations being present on said first bases, each said marking location having the capability to receive marks applied by a hand marking implement and to be thereafter erased of said marks, each said marking series being in fixed positional relation with respect to at least one of said first series located on the same respective first base and extending in substantially said single dimension of said first series, each said marking series representing at least one course of said stringed fingerboard instrument and having a single course coordinate, each said marking series being in substantially adjacent and repositionable relation with respect to said string stop series, to said tuning reference, and to said negative principal note series in a direction substantially along said single dimension of said first series, string stop coordinates along said single dimension of said marking series representing string stops along said course characteristic of musical intervals used in fingering said stringed fingerboard instrument, said string stop coordinates of said marking series having such spacings and locations as to substantially align in said various repositionings with string stop coordinates of remaining series of said plurality of note name series and with said indicia of said string stop series and of said negative principal note series and with said principal note reference when said string stop coordinates of said plurality of first series are mutually in alignment with said string stop coordinates of the remaining series of said plurality of first series;

whereby a musician can apply marks to the marking locations and compose and select a fingerboard pattern for a particular and unique chord or scale of this interest, in whatever tuning is of his choice.

* * * * *